2 Sheets—Sheet 1.
M. CZINER.
Digesters.
No. 206,391. Patented July 30, 1878.
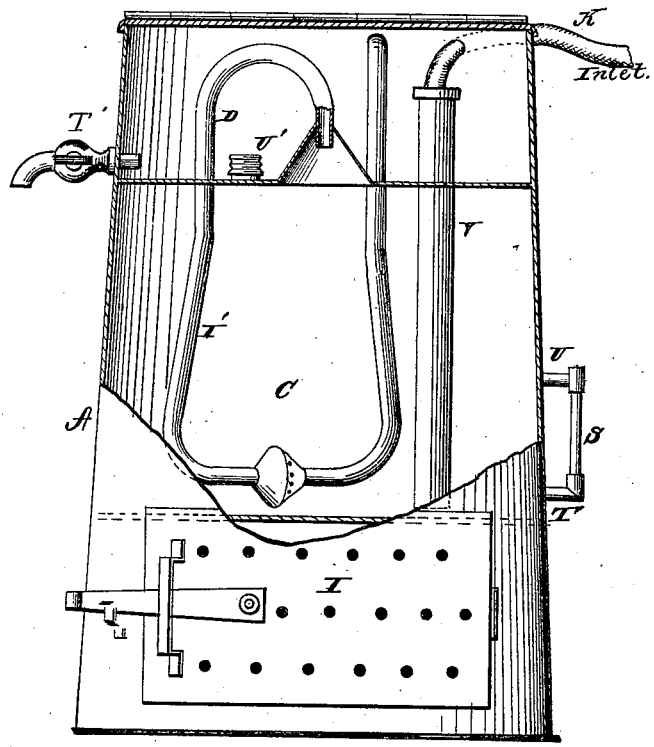
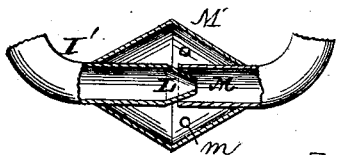
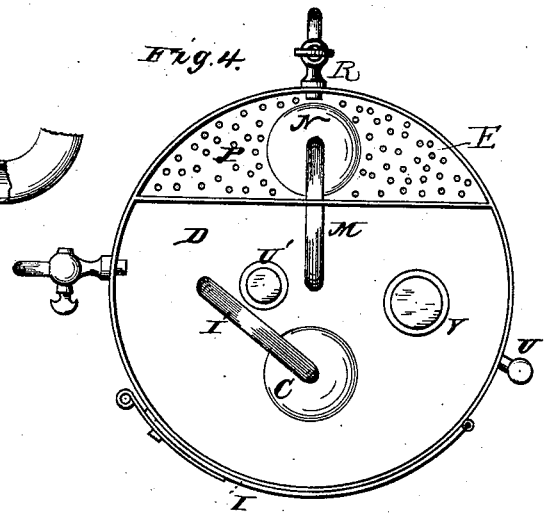
WITNESSES
INVENTOR
ATTORNEYS

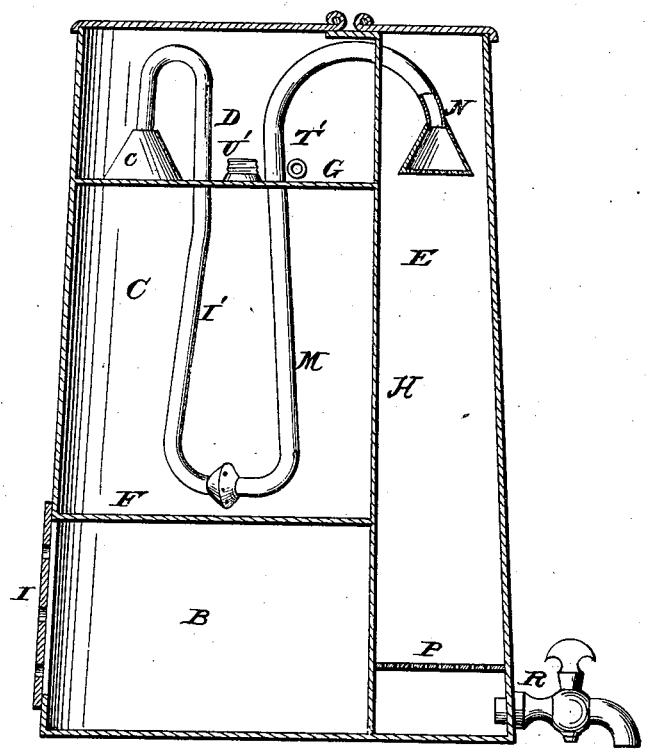

UNITED STATES PATENT OFFICE.

MATYAS CZINER, OF STAPLETON, ASSIGNOR OF ONE-HALF HIS RIGHT TO FREDERICK A. KELLING AND GEORGE J. GREENFIELD, OF RICHMOND COUNTY, NEW YORK, AND THE REMAINING ONE-HALF TO FREDERICK A. KELLING, TRUSTEE.

IMPROVEMENT IN DIGESTERS.

Specification forming part of Letters Patent No. 206,391, dated July 30, 1878; application filed May 9, 1878.

*To all whom it may concern:*

Be it known that I, MATYAS CZINER, of Stapleton, in the county of Richmond and State of New York, have invented certain new and useful improvements in apparatus for separating the alcoholic portions of fermented liquors from the nitrogenous substances contained therein, and for making fluid extracts; and do hereby declare that the following is a full, clear, and exact description thereof, which will enable others skilled in the art to which it appertains to make and use the same, reference being had to the accompanying drawings, and to letters of reference marked thereon, which form a part of this specification.

This invention relates to an improved apparatus for separating the alcoholic portions of fermented liquors from the dextrine, diastase, and other nitrogenous substances contained therein, and it is principally designed to be employed in the manufacture of vinegar, although it may be used with advantage for making fluid extracts.

In the manufacture of vinegar from malt liquors it has been found absolutely necessary to separate the alcohol from the dextrine, diastase, and other nitrogenous substances contained therein, which would impair the keeping qualities of the vinegar made from such liquors. This has heretofore been effected by distilling the liquor and condensing the vapor arising therefrom; but the process entails a heavy expense upon the manufacturer owing to the restrictions placed upon distilling apparatus by the Government.

The principal object of my invention is to obviate this objection and produce an apparatus by means of which the alcohol may be separated from the fermented liquor by vaporization, leaving the dextrine, diastase, and nitrogenous substances in suspension in the watery portions of the liquor, the alcoholic vapor being carried back into the liquor from which it has been separated, and caused to commingle with the watery portions thereof and separate the same from the dextrine, diastase, and other nitrogenous substances, as more fully hereinafter set forth.

To this end my invention consists in a closed chamber having a pipe opening from its upper part into an outer chamber and back into said chamber and provided with a jet-tube located within the open end of a pipe extending outside of said chamber, the adjoining ends of the two pipes being surrounded by a jacket or chamber provided with perforations the combined areas of which bear such relation to the area of the first-mentioned pipe at its smallest diameter that when steam is generated in the chamber the vapor will pass through said first-mentioned pipe and act as an injector to discharge the liquid from the chamber, as more fully hereinafter set forth.

In the drawing, Figure 1 represents a view of my apparatus, partly in elevation and partly in section. Fig. 2 represents a transverse section of the apparatus. Fig. 3 represents a detached sectional view of the injector, and Fig. 4 represents a top view with the covers removed.

The letter A represents a cylindrical shell or casing, constructed of metal, and divided into four chambers, B C D E, by means of the horizontal partitions F G and the vertical partition A. The compartment B is designed for the reception of a lamp or other heating device, and that portion of the casing forming the walls of said chamber is provided with a door, I, with suitable apertures, by means of which the lamp may be supplied with the air necessary to support combustion.

The chamber C is designed for the reception of the fermented liquor or other substance, and is located directly over the compartment B, in which the lamp or heating device is located.

The letter I' represents a pipe or tube extending from the compartment C, or from a funnel-shaped extension, e, on the partition, which forms its top, up into compartment D and down through the partition into the chamber C to near the bottom thereof, where it is bent and extended horizontally, its extremity terminating in a jet-tube, L, directly opposite the open end of the horizontal portion of a pipe, M, which extends upwardly and passes through the partitions G and H, and terminates in a rose-jet, N, in the upper part of the compartment E. The area of the combined perforations is considerably smaller than the area of the pipe I' at its smallest diameter, in order that when the steam generated attains sufficient pressure to discharge the liquid said perforations will not afford sufficient vent to relieve the pressure, and will thereby cause the steam to seek a passage through the pipe I' and carry the liquid entering the jacket out through the pipe M.

The compartment E is provided with a perforated false bottom, P, and from the space between the same and the bottom of the vessel extends a cock, R, through which the purified liquid may be finally drawn off.

The letter S represents a liquid-indicator, consisting of a glass tube cemented to the pipes T U extending from the bottom and top of the compartment C, its object being to show the height of the liquid in said compartment.

The upper compartment, D, through which the pipes I' and M pass, may be used for the preparation of food when the apparatus is employed as a domestic utensil.

The letter T' represents a pipe provided with a stop-cock, extending from the upper compartment of the apparatus, through which the substances held therein may be discharged. U' represents a screw-capped aperture in partition G, by means of which the chamber C may be emptied.

The letter V represents a filling-tube extending downwardly into the compartment C, and terminating near the bottom of the same, its upper end being provided with a screw-cap, by means of which it may be closed after the compartment has been filled.

The letter K represents a flexible tube, which may be inserted in the upper end of the pipe V for the purpose of filling the compartment C.

It is evident that the chamber or compartment C may be heated by a steam-coil passing directly through it, instead of a lamp or other direct heating device.

The operation of my invention is as follows: The chamber or compartment C being properly filled, heat is applied, and when the liquid reaches a boiling temperature steam or vapor is generated, creating a pressure in the vessel. This forces the liquid through the perforations in the jacket, which being too small to relieve the pressure, the vapor seeks a passage through the pipe I', which is larger in area than the combined areas of the perforations in the jacket, and thus carries the liquid with it out of the pipe M into the compartment E.

When the apparatus is employed for the manufacture of vinegar, the chamber C is charged with fermented malt liquor or beer. Upon the application of sufficient heat the alcohol contained therein will be separated from the liquor in the form of vapor, and will collect in the upper part of the chamber. Being thus freed from the dextrine, diastase, and other nitrogenous substances, it passes out through the pipe I' into the pipe M, carrying the watery portions entering the jacket through the perforations with it, leaving the dextrine, diastase, and other nitrogenous substances behind.

I am aware that an injector has been employed outside of a boiler, and connected with the steam-space of the same, to force the feed-water into the same; and this I do not claim, the essential feature of my invention consisting of an injector located within a closed chamber and connected with the steam-space of the same, and with a pipe passing outside of said chamber, in order to discharge the contents of the same.

Although, as before stated, the apparatus is chiefly designed to be employed in the manufacture of alcoholic liquor for the manufacture of vinegar, it may be used with great advantage in the manufacture of all kinds of fluid extracts, and forms an excellent device for preparing tea and coffee for domestic purposes.

Having thus described my invention, what I claim, and desire to secure by Letters Patent, is—

1. An apparatus for separating the alcoholic from the nitrogenous portions of fermented liquors, and for making extracts, consisting of a closed chamber, having a pipe opening from its upper part into the outer chamber and returning back into said chamber, and provided with a jet-tube located opposite the open end of a pipe extending outside of the chamber, the adjoining ends of said pipes being surrounded by a jacket or chamber provided with perforations, the combined areas of which latter are less than the area of the first-mentioned pipe, whereby the steam is caused to pass through said pipe and carry the liquid with it out through the last-mentioned pipe, substantially as specified.

2. In combination with the compartment C and pipes I' and M' and the injector, the compartment D above the compartment C, for the purpose of food preparation when the apparatus is so employed.

In testimony that I claim the foregoing as my own I affix my signature in the presence of two witnesses.

MATYAS CZINER.

Witnesses:
 CHAS. L. COOMBS,
 FRANCK L. OURAND.